C. O. SCHELLENBACH.
EXPANSION REAMER.
APPLICATION FILED MAY 4, 1908.

930,317.

Patented Aug. 3, 1909.

Witnesses
Oliver B. Kaiser
Leo O'Donnell

Inventor
Charles O. Schellenbach
By
Wood & Wood
Attorneys

UNITED STATES PATENT OFFICE.

CHARLES O. SCHELLENBACH, OF CINCINNATI, OHIO, ASSIGNOR TO THE SCHELLENBACH & DARLING TOOL COMPANY, OF CINCINNATI, OHIO, A CORPORATION.

EXPANSION-REAMER.

No. 930,317.      Specification of Letters Patent.      Patented Aug. 3, 1909.

Application filed May 4, 1908. Serial No. 430,740.

*To all whom it may concern:*

Be it known that I, CHARLES O. SCHELLENBACH, a citizen of the United States, residing at Cincinnati, in the county of Hamilton and State of Ohio, have invented certain new and useful Improvements in Expansion-Reamers, of which the following is a specification.

My invention relates to an expansible reamer.

The object of the invention is to obtain a simple construction in which the cutters are evenly supported upon seats, the meeting surfaces having relative inclines whereby a slight longitudinal adjustment of the cutters on their seats provides a relatively considerable degree of radial expansion.

The features of my invention will be more fully set forth in the description of the accompanying drawings, forming a part of this specification, in which:—

Figure 1:
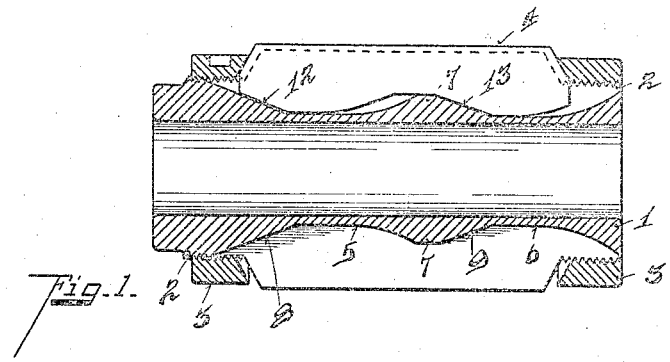
Figure 2:
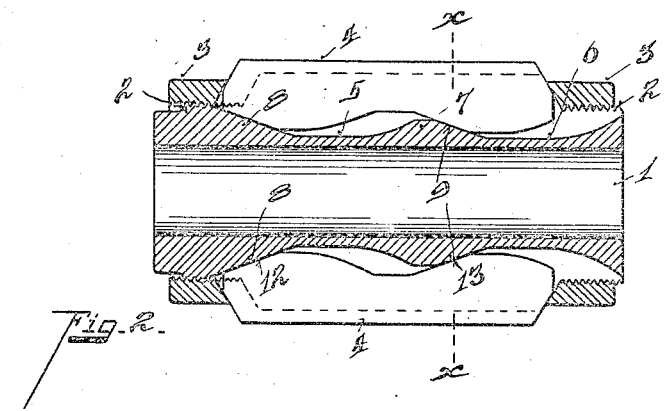
Figures 3, 4, 5:
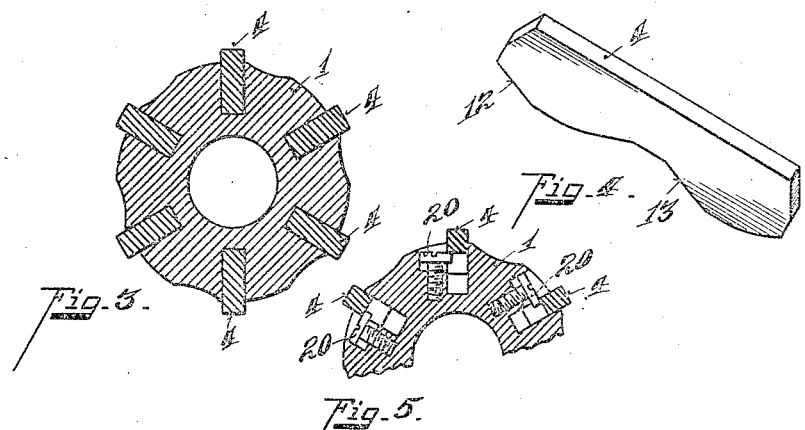

Figures 1 and 2 are central vertical sections, showing the cutters in different positions of adjustment. Fig. 3 is a section on line $x$, $x$, Fig. 2. Fig. 4 is a perspective view of one of the cutters. Fig. 5 is a central vertical section of a modification.

1 represents a sleeve having screw threaded ends 2, provided with adjusting collars 3. Between the screw threaded ends of the sleeves are formed taper seats for the cutters 4. These seats have the depressions 5, 6, upon opposite sides of a raised portion 7, thus providing the inclines 8, 9. The under side of each cutter has the counter inclines 12, 13. The ends of the cutters abut the collars 3. By adjusting the collars, the cutters are uniformly adjusted longitudinally on their seats, and a very slight adjustment varies considerably the degree of radial expansion, owing to the employment of a plurality of abrupt inclines, and at the same time the cutters are supported at each end and are expansible with absolute uniformity and evenness.

In Fig. 5, I have shown a modification useful in long reamers. To provide the middle portions of long blades with a bearing, I cut out the seats at the middle of the sleeve and insert screws 20, adjusted to form an intermediate support for the blades. The screws can be set to correspond with the positions of the blades given them by the adjusting collars 3.

Having described my invention, I claim:—

1. In an expansible reamer, a body having inclined cutter seats, cutters movably mounted in said body and having inclined surfaces near their ends adapted to bear on said cutter seats, adjusting means for said cutters, and adjustable supports for said cutters between said cutter seats, substantially as described.

2. In an expansible reamer, a body having inclined cutter seats, cutters movably mounted in said body, having inclined surfaces adapted to bear on said cutter seats, adjusting means for said cutters, and adjustable supports for said cutters between said cutter seats, substantially as described.

In testimony whereof I have hereunto set my hand.

CHARLES O. SCHELLENBACH.

Witnesses:
OLIVER B. KAISER,
LEO J. O'DONNELL.